United States Patent
Daley

[15] 3,665,759
[45] May 30, 1972

[54] WIND DIRECTION RECORDING SYSTEM

[72] Inventor: Thomas J. Daley, Raleigh, N.C.
[73] Assignee: Westinghouse Electric Corporation, Pittsburgh, Pa.
[22] Filed: May 27, 1970
[21] Appl. No.: 40,831

[52] U.S. Cl. ............................................. 73/188
[51] Int. Cl. ................................................ G01p 13/02
[58] Field of Search .................. 73/188, 189; 235/183

[56] References Cited

UNITED STATES PATENTS 3,119,260   1/1964   Karmin .................................. 73/188
3,316,761   5/1967   Frith et al. ............................. 73/189
3,552,206   1/1971   Lauter, Jr. ............................. 73/188

Primary Examiner—Richard C. Queisser
Assistant Examiner—Marvin Smollar
Attorney—A. T. Stratton and C. L. Freedman

[57] ABSTRACT

A signal is developed that is proportional to the position of a wind-direction vane. The positions which may be occupied by the vane are divided into a plurality of sectors. Each of the sectors develops a signal when the vane is located in such sector. A time-interval signal also is generated at regular intervals. Each signal is recorded in a separate track of a recording medium such as magnetic tape. From these recorded signals the average wind direction during a time interval may be calculated.

7 Claims, 2 Drawing Figures

Patented May 30, 1972

WITNESSES
Alfred D Colaizzi
James T Young

INVENTOR
Thomas J. Daley

ATTORNEY

3,665,759

WIND DIRECTION RECORDING SYSTEM

BACKGROUND OF THE INVENTION

This invention relates to a variable which may occupy any point within a large range and it has particular relation to the determination of average wind direction over a period of time. The invention is particularly desirable for the determination of integrated or average wind direction and will be discussed with respect to such an application.

Devices and techniques are known for deriving or recording instantaneous values of wind direction. However, the derivation of an integrated or average value of wind direction over a period of time introduces difficulties due to the presence of a discontinuity in a signal utilized to represent wind direction.

SUMMARY OF THE INVENTION

In accordance with the invention the range of wind direction is divided into sectors. Thus for a wind-direction vane or weather vane rotatable through an angle of 360° about an axis the range may be divided into three sectors. When the vane occupies a first sector a first pulse signal is generated at regular intervals. When the vane is in another one of the sectors a second pulse signal is generated at regular intervals. A third pulse signal is generated which has a frequency which increases as the vane rotates from its 0° position towards its 360° position. However, as the vane rotates through its 360° position the frequency of the third pulse signal drops to its lowest value thus introducing a discontinuity. A time-interval pulse signal also is generated with the pulses spaced uniformly.

Each of the pulse signals is recorded in a separate track of a recording medium such as magnetic tape. By counting the pulses recorded for the first three pulse signals during a time interval it is possible to determine the integrated or average value of wind direction over the time interval. Such information is desirable, for example, in air-pollution studies.

BRIEF DESCRIPTION OF THE DRAWINGS

For a better understanding of the invention reference may be had to the preferred embodiment exemplary of the invention shown in the accompanying drawings, in which.

DESCRIPTION OF THE PREFERRED EMBODIMENT

Figure 1:
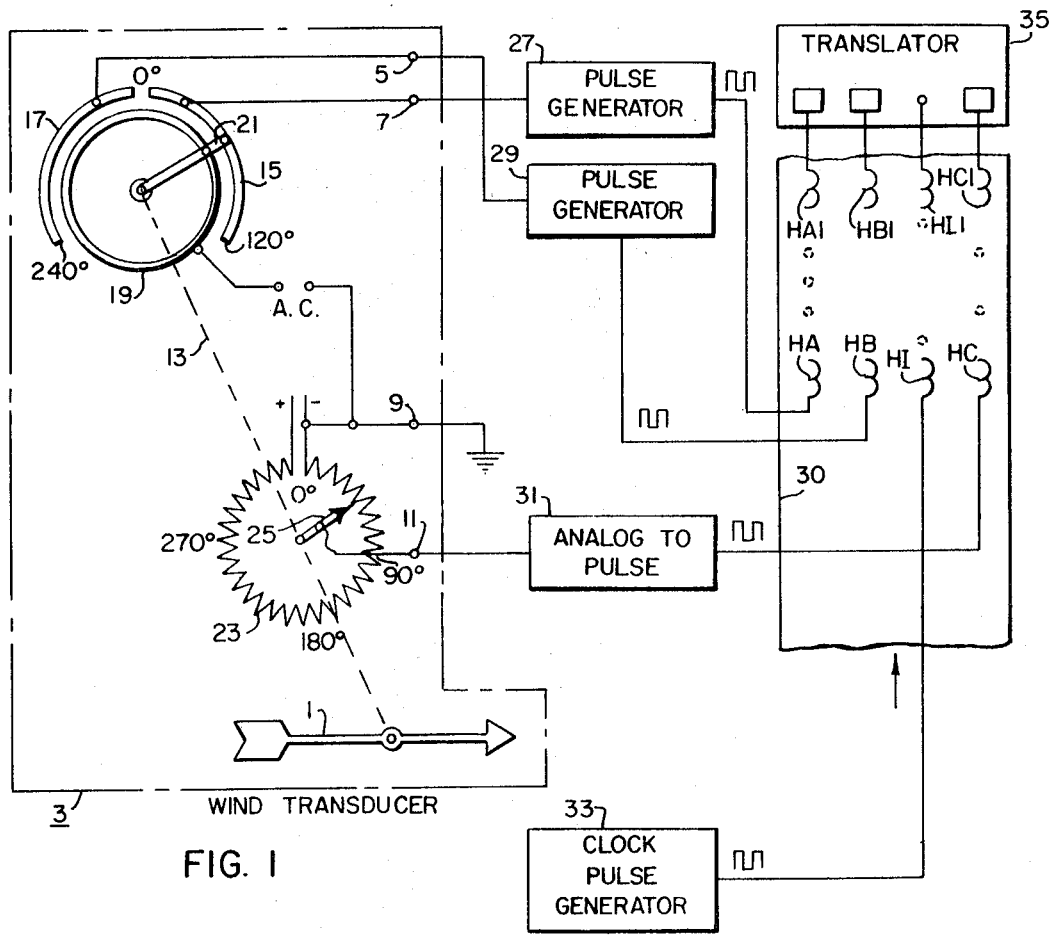
FIG. 1 is a schematic view of a wind direction recording system embodying the invention.

Referring to FIG. 1 a wind-direction vane or weather vane 1 is rotatable about an axis in accordance with the direction of wind. The vane 1 operates a wind transducer 3 for the purpose of developing electric signals at its output terminals 5, 7, 9 and 11 which may be utilized in determining wind direction.

The vane 1 is mounted on a shaft 13 for rotation through a range of 360° about the axis of the shaft. This range is divided into three sectors. In the preferred embodiment, a first sector is determined by an arcuate contact 15 which extends from 0° to 120° about the axis of the shaft 13. A third sector is determined by an arcuate contact 17 which extends from the 240° point to the 360° point about the axis of the shaft 13. A second sector is determined by the spacing between the contacts 15 and 17 and extends from the 120° point to the 240° point. A circular contact 19 is concentric with the shaft 13.

A source of voltage, assumed to be an alternating voltage having a frequency of 60 hertz and a voltage of 120° volts, is connected between the contact 19 and the terminal 9. The contacts 15 and 17 are connected respectively to the terminals 7 and 5.

A bridging contact 21 is secured to the shaft 13 for rotation therewith. It will be noted that when the vane 1 has a position between 0° and 120° the bridging contact 21 connects the arcuate contact 15 to the circular contact 19. Consequently the presence of voltage between the terminals 7 and 9 indicates the location of the vane 1 in its first sector. In an analogous manner when the vane 1 is in its third sector the bridging contact 21 connects the contacts 17 and 19 to apply a voltage between the terminals 5 and 9. When neither of these voltages is present at the terminals 5, 7 and 9 the vane is located in its second sector.

As the vane 1 moves clockwise from its 0° position towards its 360° position an increasing voltage is applied between the terminals 9 and 11. This is represented by a voltage divider having a circular resistor 23 concentric with the shaft 13. The terminals of the resistor are close together and are connected to the source of voltage which for exemplary purposes will be assumed to be a direct voltage of six volts. The polarity of the voltage is shown by polarity marks plus and minus in FIG. 1. The negative terminal of the source of voltage is shown connected to the terminal 9.

The shaft 13 carries a contact arm or wiper 25 which cooperates with the resistor 23 to form an adjustable voltage divider. This contact arm is connected to the terminal 11.

As the vane 1 moves from its 0° position in a clockwise direction toward its 360° position a voltage appears between the terminals 9 and 11 which increases linearly from a low initial value such as zero to a higher value such as 6 volts. As the vane passes through its 360° position the voltage drops from 6 volts to 0 volts thus introducing a discontinuity.

A slight discontinuity also results from the spacing of the ends of the resistor 23. However this spacing may be held to a low value such as 5° and the accuracy of the system of FIG. 1 is adequate.

When the vane 1 is in the sector represented by the contact 15, a voltage appears between the terminals 7 and 9. This voltage activates a pulse generator 27 to produce pulses at a predetermined rate such as 3600 pulses per hour. These pulses are recorded in one track of a suitable recording medium such as a magnetic tape 30 as it moves uniformly in the direction of the arrow. A suitable recorder is shown in the Snyder U.S. Pat. No. 3,470,470 which issued Sept. 30, 1969. A recorder of this type is manufactured by the Westinghouse Electric Corporation, Raleigh, North Carolina and is described in a publication DB 42–565WR dated Jan. 1969 and published by the Westinghouse Electric Corporation, Raleigh, North Carolina. A wiring diagram for such a recorder is shown in wiring diagram 42–565 dated June 1967 and published by the aforesaid Westinghouse Electric Corporation. The recorder heads HA, HB, HI and HC of FIG. 1 correspond respectively to the record heads 9, 9b, 9c and 9a of the aforesaid Snyder patent.

In an analogous manner when the vane 1 is in the sector represented by the contact 17 a pulse generator 29 is activated to produce pulses at a suitable rate such as 3600 pulses per hour which are supplied to the record head HB to be recorded in a separate track of the tape 30.

The voltage appearing between the terminals 9 and 11 is applied to an analog-to-pulse generator 31 which produces pulses having a frequency dependent on the magnitude of the voltage between the terminals 9 and 11. Such a generator is well known in the art and may for example take the form of a relaxation oscillator. The pulses are supplied to the record head HC in order to be recorded in a separate track of the tape 30. As representative of suitable parameters the pulses produced by the generator 31 may vary between an initial low rate such as 0 and a maximum of 3600 pulses per hour dependent upon the position of the vane 1.

A clock pulse generator 33 is provided for designating time intervals on the magnetic tape 30. This generator may produce pulses at a selected rate which for exemplary purposes will be assumed to be four pulses per hour. These pulses are supplied to the record head HI for recording in a separate track of the tape 30.

After the tape has been recorded it may be analyzed in a suitable translator. For exemplary purposes it will be assumed that reproduce heads HA1, HB1, HI1 and HC1 are associated with the respective tracks for the purpose of supplying the pulse signals recorded in the tape to a suitable translator 35. This translator may be a computer or counter-arrangement which counts the number of pulses recorded between successive time interval pulses by the heads HA, HB and HC.

The average wind direction (AWD) is given by the following expression:

$$AWD = 360/K \, (C + AK/A + B)$$

where

A = number of pulses in the recording channel for the 0°—120° sector for the time interval.

B = number of pulses in the recording channel for the 240°—360° sector for the time interval.

C = number of pulses in the recording channel for the position of vane 1 for the time interval.

K = maximum pulse rate of C (Assuming a rate of 3600 pulses per hour the maximum per fifteen minute interval would be 900 pulses).

From the recorded information it is possible to determine the time during which the wind direction is in the first and third sectors for any interval. The difference between this time and the value of the interval represents the time during which the wind direction is in the second sector. From this information the operator can recognize when the wind direction is too variable for realistic averaging.

Figure 2:
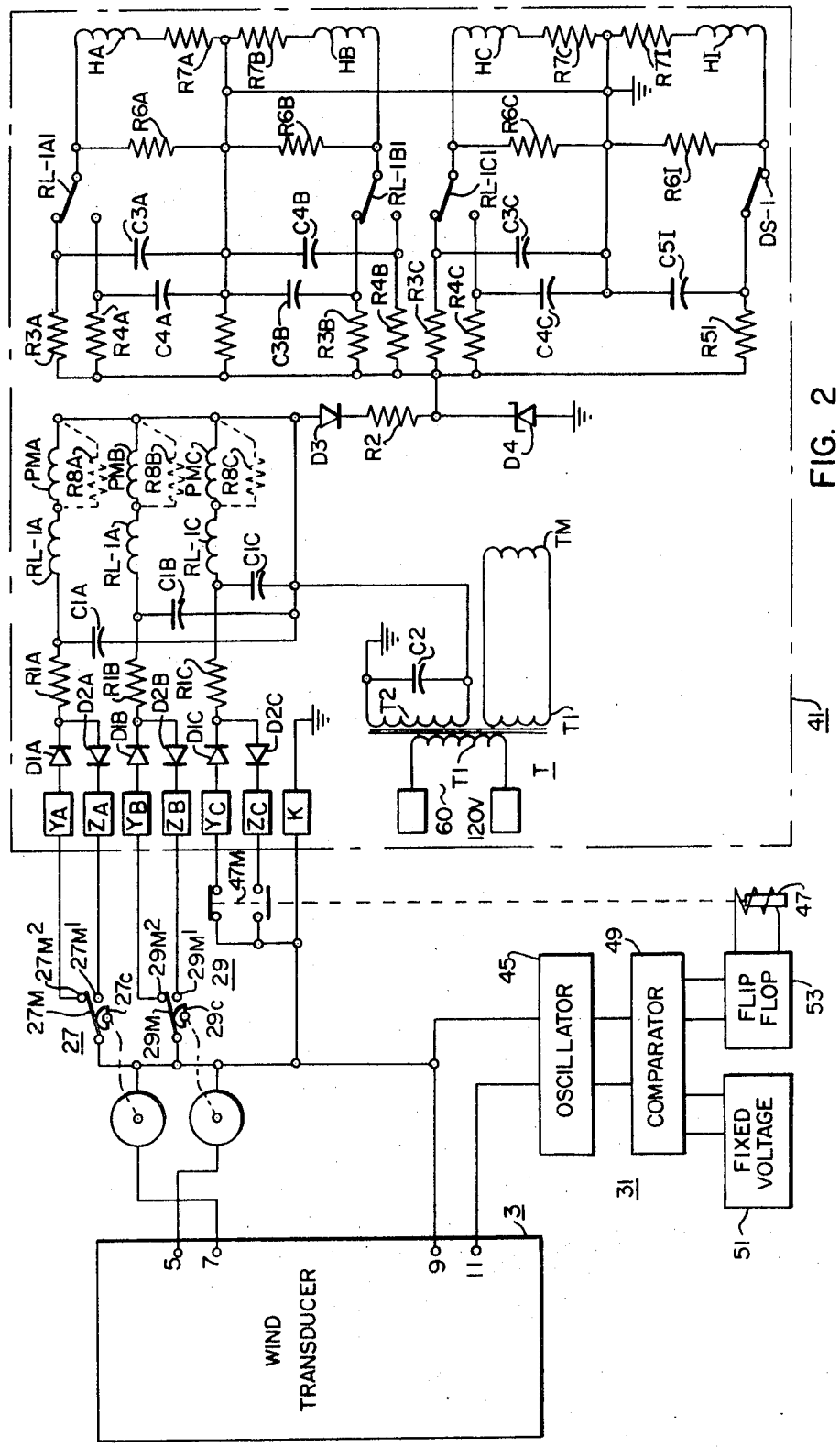
FIG. 2 is a schematic view of a preferred embodiment of the system shown generally in FIG. 1.

In FIG. 2 circuits for a recorder 41 are illustrated which are similar to circuits shown in the abovementioned wiring diagram 42–565. This recorder has a common input terminal K which is grounded and terminals for three channels. Thus the input terminals $Y_A$ and $Z_A$ are for the channel A, the terminals $Y_B$ and $Z_B$ are for the channel B and the terminals $Y_C$ and $Z_C$ are for the channel C. These channels supply information to the three record heads respectively HA, HB and HC. The recorder is energized through a transformer T having a primary winding T1 which may be energized from an alternating source having a frequency of 60 hertz and a voltage of 120° volts. The transformer has a secondary winding T1 which energizes a timing motor TM. A second secondary winding T2 supplies electric energy for the remaining circuits of the recorder. A fourth record head HI records interval pulses in a manner similar to the recording of interval pulses in the above-mentioned wiring diagram. For illustrative purposes the record head may record interval pulses which are spaced 15 minutes apart.

The remaining reference characters employed for the recorder 41 are similar to those shown in the wiring diagrams above-mentioned except for the addition of suffixes A, B, C and I to designate respectively the specific channels A, B, C and I with which the components are associated. The reference characters C represent capacitors, the reference characters D represent diodes or rectifiers, and the reference characters R represent resistors. Each of the channels A, B and C has a polarized or latching relay which conveniently may be a conventional form C relay. Thus for the channel A when the relay RL–1A is energized by current flowing in the direction of the rectifier D1A, the contact RL–1A1 of this relay is in its upper position as shown in FIG. 2. This connects the capacitor C3A across the record head HA through a resistor R7A. The movable contact remains in this position until the relay RL–1A is energized by current flowing in the direction of the rectifier D2A. When so energized the movable contact RL–1A1 moves to its lower position to connect the capacitor C4A across the record head HA through the resistor R7A.

The capacitors C3A and C4A are charged from the secondary winding T2 through a rectifier D3 and suitable resistors. When one of the capacitors is connected across the associated record head a pulse of current is supplied by the connected capacitor to the head for the purpose of recording a well-defined pulse in the magnetic tape.

The timing motor TM closes a switch DS1 briefly at the end of each interval which for exemplary purposes is assumed to be of 15 minutes duration. Such closure connects a capacitor C5I across the record head HI through a resistor R7I for the purpose of recording an interval pulse in the magnetic tape. The capacitor C5I is charged through the rectifier D3 and suitable resistors from the secondary winding T2. The reference character D4 designates a Zener diode. The constant direct voltage across this Zener diode is utilized for charging the capacitors.

Conveniently the pulse generator 27 may comprise a synchronous motor which is connected for energization between the terminals 7 and 9 of the wind transducer 3. Consequently, as long as the wind direction is in the sector 0° to 120° the synchronous motor rotates at a uniform rate. The synchronous motor rotates a cam 27C which controls the position of the movable contact 27M. This movable contact is biased towards a lower fixed contact 27M1. The high part of the cam moves the movable contact 27M away from engagement with the lower fixed contact 27M1 into engagement with an upper fixed contact 27M2. The movable contact is connected to the input terminal K whereas the fixed contacts 27M1 and 27M2 are connected respectively to the input terminals $Z_A$ and $Y_A$. In a similar manner the pulse generator 29 may include a synchronous motor connected across the terminals 5 and 9 and operating contacts associated with the channel B.

In FIG. 2 the analog-to-pulse converter generator includes an oscillator 45 having a frequency output which varies in accordance with the magnitude of the voltage input to the oscillator. The oscillator input is derived from the terminals 9 and 11 of the wind transducer 3.

The output of the oscillator is employed for flipping the movable contact 47M of a relay 47 between two fixed contacts which are connected respectively to the input terminals $Y_C$ and $Z_C$ of the recorder 41. The movable contact of the relay is connected to the common ground terminal K.

In the specific embodiment of FIG. 2 the oscillator 45 may have a sawtooth output which is delivered to one input of a comparator 49. Each pulse of the oscillator output is compared with a fixed voltage derived from a suitable source 51. When the sawtooth voltage reaches a value equal to that of the fixed voltage, a pulse is delivered by the comparator to a flip-flop 53 for the purpose of reversing the direction of current through the coil of the relay 47. This relay is assumed to be of the polarized type such as a conventional reed form C relay. As a further example the relay may have mercury wetted contacts. It will be understood that each reversal of current in the relay coil operates the movable contact from the fixed contact with which it is in engagement to the other fixed contact. A comparator-relay combination operating in this manner is in the temperature transmitter model 111–125 manufactured by the Hagan Computer Systems Division of Westinghouse Electric Corporation, Pittsburgh, Pennsylvania.

As previously pointed out, after a recording has been made in the magnetic tape 30, the tape may be analyzed in a translator or computer or manually to count the pulses in each of the tracks for the channels A, B and C which occur between successive interval pulses. These counts then may be utilized to calculate average wind direction as above described.

I claim:

1. A device for use in determining the average value of a variable which may fluctuate in a predetermined path comprising first means for producing a first signal representative of the presence of the variable in a first portion of the path, second means for producing a second signal representative of the presence of the variable in a second portion of the path, with the first and second portions of the predetermined path being less than the total path, third means for producing a third signal dependent in value on the position of the variable in the path, with said third signal starting at a minimum value at one end of the path and increasing to a maximum value at the other end of the path, and fourth means separately recording each of said first, second, and third signals, said recorded first and second signals indicating the time, of a predetermined period of time, spent by the variable in their associated portions of the path, the sum of said recorded first and second signals relative to a value representative of the predetermined period of time, indicating the time spent by the variable in the portion of the path other than the first and second portions, and the sums of the first, second and third signals enabling the average position of the variable in the path to be determined.

2. A device as claimed in claim 1 wherein the first means comprises means for producing pulses at a fixed rate during presence of the variable in the first portion of the path, the second means comprises means for producing pulses at a fixed rate during presence of the variable in the second portion of the path and the third means comprises means for producing pulses at a rate dependent on the position of the variable in the path.

3. A device as claimed in claim 1 in combination with means for producing a time interval fourth signal comprising pulses at a predetermined fixed frequency.

4. A device as claimed in claim 1 in combination with a translator for responding to each of said recorded signals.

5. A device as claimed in claim 1 wherein said variable is wind direction, said first means comprising a wind vane rotatable in a 360° angular path about a predetermined axis to a position corresponding to instantaneous wind direction, said angular path being divided into first, second and third successive sectors, the first sector extending substantially from a point adjacent a 0° wind direction, and the third sector terminating substantially adjacent a 360° wind direction, and means for generating pulses at a fixed rate only during the presence of said wind vane in the first sector, said second means comprising means for generating pulses at a fixed rate only during the presence of said wind vane in the third sector, and the third means comprising means for generating pulses at a rate which varies from an initial rate as the wind vane rotates in one direction from a first position corresponding substantially to a 0° wind direction to a final rate as the wind vane reaches a position adjacent the 360° wind direction, whereby each position of the wind vane between the first and second positions has a distinctive rate of pulse generation for the third signal, the rate of pulse generation for the third signal returning to said initial rate as the wind vane rotates in said one direction from the second position to the first position.

6. The method of ascertaining data for use in averaging wind direction which comprises generating first pulses (C) at a rate which varies from a first value when the wind direction is adjacent 0° towards a second value ($K$) as the wind direction varies in a first direction of change towards a point adjacent 360°, generating second pulses (A) at a fixed rate only while the wind direction is in a first sector extending from substantially the 0° direction in said first direction for substantially less than 360°, generating third pulses (B) at a fixed rate only while the wind direction is in a second sector located between the first sector and the 360° wind direction, and counting the numbers of the first, second and third pulses occurring during a predetermined time interval.

7. The method of claim 6 in combination with the step of computing the average wind direction (AWD) from the numbers of the pulses A, B, C occurring during a predetermined interval by the equation:

$$AWD = 360/K \, (C + AK/A + B).$$

* * * * *